Figure 1:
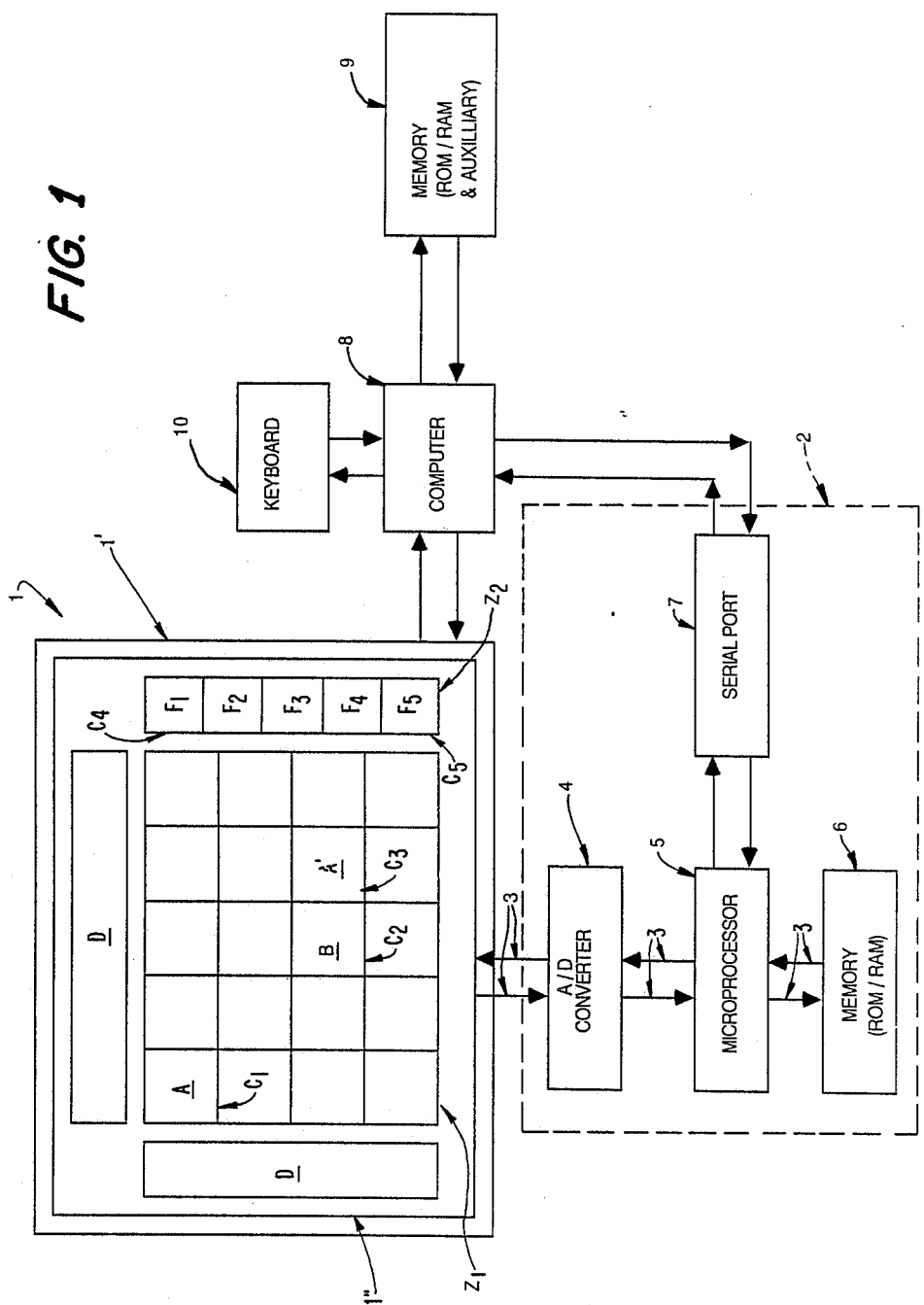

United States Patent [19]

Logan et al.

[11] Patent Number: 4,821,029

[45] Date of Patent: Apr. 11, 1989

[54] TOUCH SCREEN COMPUTER-OPERATED VIDEO DISPLAY PROCESS AND APPARATUS

[75] Inventors: James D. Logan, Arlington; Yury Litvin, Bedford, both of Mass.

[73] Assignees: Microtouch Systems, Inc., Middlesex; The Academy of Applied Science, Boston, both of Mass.; a part interest

[21] Appl. No.: 604,319

[22] Filed: Apr. 26, 1984

[51] Int. Cl.$^4$ .................................................. G09G 1/00
[52] U.S. Cl. .................................... 340/712; 340/706; 340/721; 178/18
[58] Field of Search ............... 340/789, 706, 707, 708, 340/709, 710, 711, 712, 716, 721, 724; 178/18; 273/148 B, DIG. 28

[56] References Cited

U.S. PATENT DOCUMENTS

| | | | |
|---|---|---|---|
| 3,189,889 | 6/1965 | Bridgett | 340/707 |
| 3,482,241 | 12/1969 | Johnson | 340/337 |
| 3,757,322 | 9/1973 | Barkan et al. | 340/365 |
| 3,911,215 | 10/1975 | Hurst et al. | 178/18 |
| 4,220,815 | 9/1980 | Gibson et al. | 178/18 |
| 4,310,839 | 1/1982 | Schwerdt | 340/712 |
| 4,374,381 | 2/1983 | Ng et al. | 340/711 |
| 4,451,895 | 5/1984 | Sliwkowski | 340/707 |
| 4,475,239 | 10/1984 | van Raamsdonk | 340/707 |
| 4,476,463 | 10/1984 | Ng et al. | 340/712 |
| 4,524,421 | 6/1985 | Searby et al. | 340/706 |
| 4,550,221 | 10/1985 | Mabusth | 340/706 |
| 4,621,257 | 11/1986 | Brown | 340/712 |
| 4,656,603 | 4/1987 | Dunn | 340/721 |

OTHER PUBLICATIONS

PC Magazine, "The Tale of the Mouse", vol. 1, No. 10, Feb. 1983, pp. 66–71.

Primary Examiner—John W. Caldwell, Sr.
Assistant Examiner—Jeffery A. Brier
Attorney, Agent, or Firm—Rines and Rines; Shapiro and Shapiro

[57] ABSTRACT

The invention provides a novel computer-operated touch screen video display system in which the human operator by first touching a sub-area or chamber of the screen containing predetermined graphic information and then pointing on the screen to a different sub-area or chamber where it is desired to display said information may cause the processing equipment automatically to effect the transfer of said graphic information to and display of the same at the different sub-area, while also storing the information in the memory of the processing equipment.

10 Claims, 2 Drawing Sheets

TOUCH SCREEN COMPUTER-OPERATED VIDEO DISPLAY PROCESS AND APPARATUS

The present invention relates to computer operated video display systems and processes, being more particularly concerned with novel techniques and apparatus for enabling the user to transfer graphic display information and data to different sub areas, chambers or regions of the display by user-friendly touch techniques operable upon the touch screen of the display system.

The basic concept and routines involving touch displays have been well developed in recent years, stemming from early concepts involving pluralities of touch sensitive contacts adjacent the screen of cathode-ray-tube display systems used in data processing and related operations (as described, for example, in U.S. Pat. No. 3,482,241) to more sophisticated resistive touch-screen displays such as those described in U.S. Pat. Nos. 3,911,215, 3,757,322, 4,220,815 and 4,374,381. In the present art of transferring data provided on a screen surface, two primary methods are used. The first involves the use of a keyboard or other remote non-graphic device to block or separate a section of data and subsequently to perform a transfer, copy or storage operation. The difficulty inherent in such a remote system includes the loss of simplicity between coordinating key strokes to data output and a lengthy menu type list of operating parameters that must be used.

The second common method for block manipulation of output data on a screen involves the use of a pointer system such as that commonly referred to as a "mouse", as described, for example, in an article entitled "The Tail of the Mouse", PC Magazine, Vol. 1, No. 10, February, 1983, p. 66, on. In such a system, a cursor or other graphic symbol is remotely located to an area designating a portion of the output screen, providing a begin-block parameter. The "mouse" is then moved to the end of the data block to be manipulated, and remotely an end-block parameter is located upon the screen. Additionally, remotely, as by a keyboard device, the data is then transferred, copied or stored as noted above. The "mouse" operative systems also allow for the designation of certain predefined blocks of output data to allow block transfers to occur.

With both of the aforementioned methods, remote designation of the visually produced output of data must be achieved by external keyboards and related mechanisms.

Underlying the present invention is the breaking with the convention previously considered necessary in the art of employing external or remote mechanisms for triggering and initiating the transfer of graphically presented information from one sub-area of the screen to another desired sub-area, and providing a novel approach that enables the human operator to employ only elements of the touch screen itself, cooperative with associated processing, to enable such transfer. This is effected, moreover, with the very desirable human engineering factor that the user may visually locate and merely touch a sub-area or region of the display where the user desires the graphic information to be displayed, initially identifying such information by touching first the sub-area where it is being displayed; and that this human touching operation will initiate and control the transfer to the desired sub-area of the graphic information then displayed elsewhere —all merely by pointing on the touch screen surface alone.

In present-day touch screen systems before referenced, the art has taken the natural course of, in effect, transferring the function keyboard or keys to the designated portions of the touch screen display, but still requiring the human operator to understand what is involved in operating these various function keys. This technique only transfers the external function keys in the keyboard to representations of the keys displayed on the graphic display.

What is believed to be one of the break-through factors of the present invention is the freeing of the operator from this task of understanding and operating function keys whether remote from the display or presented upon the display; and through the novel concept underlying the invention of actually using the touch screen as the self-sufficient control mechanism, obviating the necessity for function keys (whether remote or represented on the display) or the knowledge by the operator of the use of function keys.

The present invention therefore provides a particularly user-friendly environment that allows an operator to visually, tactilely and graphically designate a desired section of displayed data and to perform automatic display and storage operations upon that data without having had specific training, and thus removes the associated complexities with learning and operating parameters and other non-data distinguishing parameters that are not a direct subject of the provided data.

An object of the present invention, accordingly, is to provide a new and improved touch screen computer-operated video display and processing system which completely obviates the necessity for function keys and knowledge of their operation and for external indicators, such as the before-mentioned "mouse", and provides a new dimension in user-friendly function of the touch screen itself wherein the operator, by pointing to the desired sub-area where graphic data earlier pointed to as displayed elsewhere is to be transferred, can automatically cause this to happen merely by touch of the screen at the appropriate subareas.

The invention thus provides a "seeing and pointing" revolutionary and new visual interface for software, allowing direct interaction with personal and other computers by simply touching the screen, providing easier cursor control, menu selection and command input without cumbersome key stroke combinations to remember or cursor keys to toggle. In addition, the present invention provides faster operation than indicated in systems such as the "mouse", or other pointing devices, because there is no remote or intermediate device to grasp, orient or manipulate—the user getting directly to the desired part of the screen with a single, efficient touch motion, and without training. Further features reside in the versatility that any type of graphic display information, icons, words and characters can be accurately pointed to with the finger; and, of course, graphic display buttons, dials or switches or the like on the screen may be manipulated like real objects with no moving parts to go wrong or rolling mechanisms to stick or fragile components to fail.

A further object is to provide a vastly more flexible touch screen process and system that incorporates, together with the appropriate processing, a self-sufficiency of control to the touch screen never before attained Other and further objects will be explained hereinafter and are more particularly delineated in the appended claims.

In summary, from of of its view points, the invention embraces in a touch-screen computer operated video display system provided with data processing controls for storing and displaying data in graphic form upon the display, a process that comprises, dividing the area of the display into a plurality of sub-areas; displaying graphic information provided by the processing in a predetermined subarea; touching at least a point of the said predetermined sub-area at the touch screen and then subsequently touching at least a point of a different sub-area to which it is desired to transfer said graphic information displayed at the predetermined sub-area; controlling the processing in response to the subsequent touching to transfer to and display the same graphic information displayed at the predetermined sub-area at, said different sub-area, upon the said subsequent touching of said different sub-area; and maintaining storage in said processing of said predetermined information. Preferred and best mode embodiments will be hereinafter presented.

Figure 2:
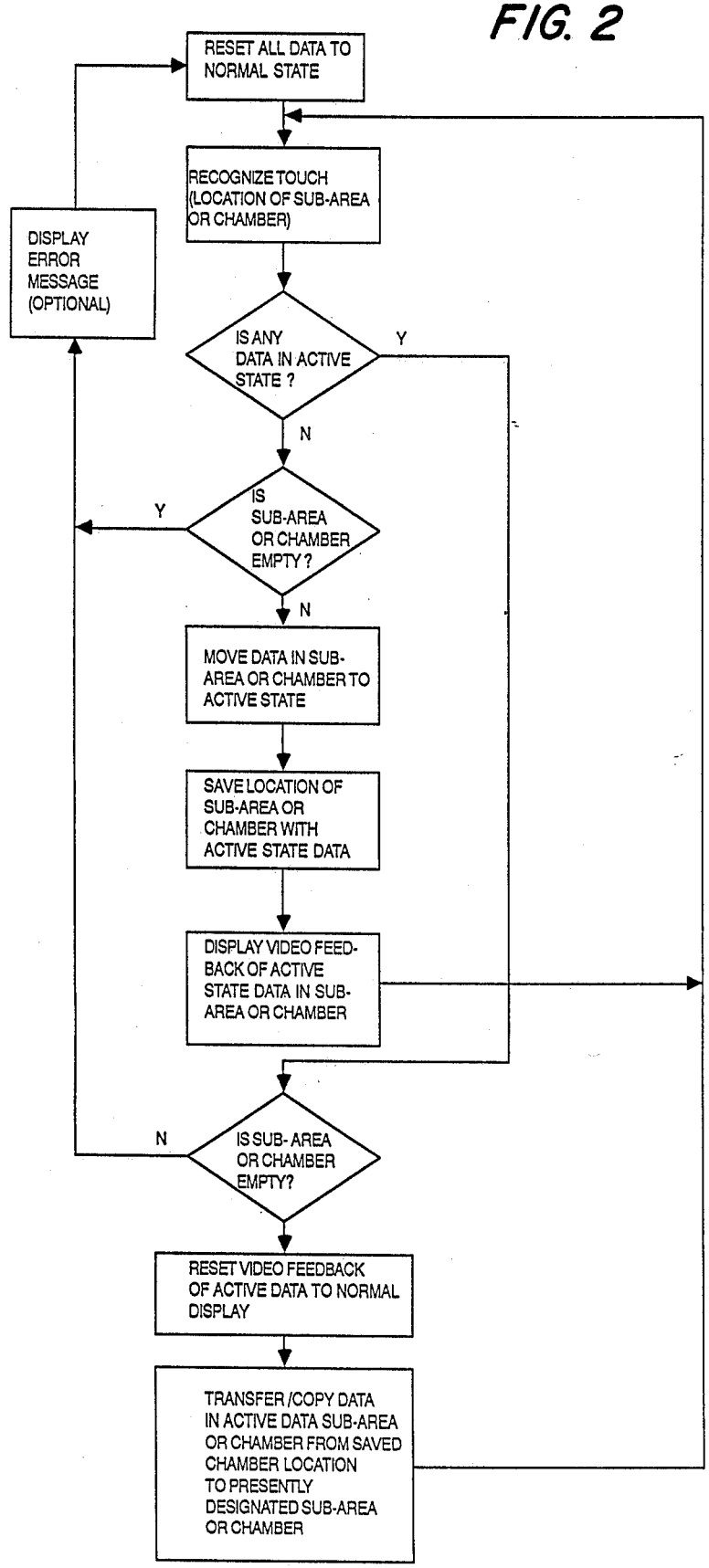

The invention will now be described in connection with the accompanying drawings, FIG. 1 of which is a schematic illustration of a touch sensitive video screen output device operated with processing in accordance with the present invention; and FIG. 2 is a flow chart of a procedure for locating and moving/copying data from one sub-area, region or chamber to another on the touch-sensitive video screen output device of FIG. 1.

Referring to FIG. 1, a video screen device having a superimposed sensitive touch screen located over the display is designated at 1. Such a touch-screen system may be of an impedance sensing variety to determine a desired location upon the surface by proximity or contact of an object, such as a human finger or stylus as described, for example, in said U.S. Pats. Nos. 3,911,215 and 4,220,815, and as described in an article entitled "TIX adds touch communication to your display" published by Elographics, Inc., Oak Ridge, TN 37830. The touch screen is provided with a video display unit $1'$ and a preferably transparent touch sensitive screen unit $1''$ generally superimposed over the video display unit $1'$ and shown in FIG. 1 as slightly smaller than the video display unit $1'$ for illustration clarity. The touch sensitive screen unit $1''$ portion of the video screen device 1 is electronically connected to a touch screen controller 2 as by suitable electronic connections 3.

The touch screen controller 2 is composed of an analog to digital (A/D) converter 4 which converts the analog signals received from the touch screen $1''$ to digital signals that are passed to a microprocessor controller 5. The microprocessor 5, in conjunction with an associated memory unit 6, converts the signals representing contact on the touch screen $1''$ into a representative coordinate on the touch screen $1''$. The touch screen controller 2 is additionally provided with a serial port 7, connected to the microprocessor 5, for contact with a general purpose processor or computer, such as computer 8.

The computer 8 has associated memory, such as memory unit 9, which may include mass storage devices as well as random access memory (RAM) and read only memory (ROM). The computer 8 may also be provided with one or more non-touch screen data input devices, such as keyboard 10, and one or more data output devices such as video display unit $1'$. In general operation, the computer 8 outputs data to the video display unit $1'$ which is viewable through the preferably transparent touch screen $1''$.

Referring more specifically to the touch screen $1''$, as shown in FIG. 1, the area of the touch screen $1''$ is segregated into one or more zones of sensitivity as designated by the letter Z. The zones can be further reduced to one or more sub-areas or chambers, as designated by the letter C. The zones Z represent the surface areas on the screen $1''$ in which the microprocessor 5 will recognize a touch on the screen $1''$, and determine the location or coordinates of the touched point on the screen $1''$. By "touch" is meant actual contact by pointing with the finger (as for resistive touch screens) or very close contact (as with capacitive touch screens).

The sub-areas or chambers, such as $C_1$-$C_5$, are pre-designated areas in which a point within the area will be used to designate the entire specific sub-area or chamber C. To this end, when a finger, or other pointing device designates a point on a zero Z of sensitivity, the microprocessor 5 receives signals from the touch screen $1''$ through the A/D converter 4 and computes the coordinates of the point location on the touch screen $1''$. If the coordinates are within a sub-area or chamber C, that subarea or chamber is therefore designated. Additionally, the computer 8 should display output data in such a form as to have discrete blocks of data displayed under specific sub-areas or chambers C, such that the designation of a sub-area or chamber C, by touching any point within the sub-area or chamber C, can be interpreted by the computer as blocking or designating the data displayed below the specified sub-area or chamber C.

The computer 8 may also display data on the display $1'$ in areas outside of the zones of sensitivity Z, such as in display areas D. Such display areas D can be used to provide headings or explanatory material that will not be manipulated by the touch screen process.

As an example, the first zone of sensitivity Z may be divided into twenty (20) sub-areas or chambers, including $C_1$-$C_3$. Sub-area $C_1$ lies above the displayed data A and sub-area $C_2$ lies above the displayed data B. The human operator wishes to transfer data A to a new location associated with the sub-area $C_3$. In operation, the user will designate the data A by first touching any point within the sub-area $C_1$. The microprocessor 5 will recognize the touching contact with the touch screen $1''$, since the contact is within a zone of sensitivity $Z_1$, and will compute the coordinates of the point of touching contact on the touch screen $1''$, as is known. Since the point of contact is within the sub-area $C_1$, coordinates of the sub-area $C_1$ are passed to the computer 8 and the computer 8 will recognize that the data A being displayed under the predetermined sub-area $C_1$ is being designated. To move the data A to a new and different location at sub-area $C_3$, the human operator merely subsequently touches any point on the touch screen $1''$ within the sub-area $C_3$ and the microprocessor 5 will compute the coordinates of the new point of contact and pass to the computer 8 the designation of the new sub-area $C_3$. The computer 8 will then erase the data A from the location of sub-area or chamber $C_1$ and display the data at sub-area $C_3$, shown by the dotted $A'$ in FIG. 1.

Additionally, the computer 8 may display dividing lines or provide other visual means for graphically showing the limits on the sub-area or chambers C to the operator. Such graphic aids may include highlighting, such as reverse video imaging, of the data A after it has been designated for moving and de-highlighting the data A after it has been moved.

Referring now more particularly to the flow chart of FIG. 2 and in conjunction with the previously described operation in FIG. 1, the system is generally in a reset mode wherein no data is specifically designated and is therefore considered in a normal state. When a touch is recognized on a sensitive zone Z of the touch screen 1'', as within sub-area or chamber $C_1$, the coordinates of the touch point are determined as noted above and the location of chamber $C_1$ is sent to the computer 8. After a subarea, such as sub-area or chamber $C_1$, is designated, the computer checks to see if any data is presently in an active state. If data is in active state, a transfer operation will commence, as described hereinafter. If no data is presently in an active state, an activating or data designation operation occurs. Specifically, to designate the data A, the computer 8 receives from the microprocessor 5 the location of the data (under sub-area or chamber $C_1$) as previously described. The computer 8 then checks to see if any data is in the area of sub-area or chamber $C_1$. If no data is present, the system may provide visual, auditory or other suitable error messages and returns to a reset state. If data, such as data A, is recognized by the computer, the data is moved to an active state, the location of the sub-area or chamber $C_1$ is saved for future transfer needs and an active video display feedback may be imposed, such as setting the data A under chamber $C_1$ in reverse video. The system then returns to a waiting mode until a new touch is recognized.

When a new touch is recognized, the computer 8 again checks to see if any data is in the active state. Finding that data A located in predetermined sub-area or chamber $c_1$ is presently in an active state, the computer checks to see if the newly designated or different chamber $C_3$ is presently empty of data. If the newly designated sub-area or chamber C is not empty, such as would exist if the operator touched sub-area or chamber $C_2$ containing data B after touching sub-area or chamber $C_1$ containing data A, the computer 8 would display some suitable error message as noted above. If the newly designated different desired sub-area or chamber C is presently empty, as chamber $C_3$ in the above example of FIG. 1, the computer 8 will reset the video feedback of the active data A, such as by removing the reverse video format of the data A. It then will transfer or copy the data A which is presently in an active state to the new location at sub-area or chamber $C_3$ by using the location of the data at $C_1$, previously saved by the computer, and the location of the new sub-area or chamber $C_3$ as provided to the computer 8 by the microprocessor 5, as previously described. The system then returns to a reset state wherein no data is in an active state.

The choice to transfer (move the data to a new location and erase or terminate the data from the old location), copy (move the data to a new location) or place in memory (copy the data to a memory location not on the display screen) which can be used in conjunction with either the transfer or copy procedures and/or used independently, is determined by either default requirements of the general computer 8 software or by designated function keys, such as those that may be provided on the keyboard 10 or may be placed on a sensitive zone, such as zone $Z_2$ on the touch screen 1'' and designated by the display screen 1' as one or more function keys, (such as $F_1$–$F_5$ located at sub-areas or chambers such as $C_4$ and $C_5$) in a manner for designation, as previously described.

The transfer of the graphic information through this pointing technique on the touch screen 1'' of the computer monitor of the invention may also serve as a command to the computer 8, such as, for example, to transfer information from one file to another, or to transfer program information to an editor, compiler or printer or the like, in well-known fashion.

Further modifications will also occur to those skilled in this art and such are considered to fall within the spirit and scope of the invention as defined in the appended claims.

What is claimed is:

1. In a touch-screen video display system provided with data processing means for storing and displaying information upon a touch-screen display, a process that comprises, dividing the area of the touch-screen display into a plurality of sub-areas; displaying information provided by the processing means in a predetermined sub-area, the provided information having a specific configuration; touching at least a point of the said predetermined sub-area of the touch screen display and then subsequently touching at least a point of a different sub-area to which it is desired to transfer said information displayed at the predetermined sub-area; controlling the processing means in response to the subsequent touching to transfer to, and display the same configuration of information displayed at the predetermined subarea at said different sub-area upon the said subsequent touching of said different sub-area; and maintaining storage in said processing means of the transferred information.

2. A process as claimed in claim 1 and in which said processing means is controlled in response to said touching at the said different subarea to terminate the display of said information at said predetermined sub-area.

3. A process as claimed in claim 1 and in which the said information remains in the said predetermined sub-area and is copied in said different subarea.

4. A process as claimed in claim 1 and in which said dividing the area of the touch-screen display into a plurality of sub-areas comprises controlling the processing means so as to display on said touch-screen display predetermined boundaries of said sub-areas.

5. A computer monitor apparatus having, in combination, touch-screen video display means; computer data processing means including means for storing and causing the displaying of information upon the touch-screen display means at a plurality of sub-areas of the touch-screen display means; means responsive to the touching of at least a point of a predetermined sub-area at which information having a specific configuration is displayed and then the subsequent touching of at least a point of a different sub-area to which it is desired to transfer said information displayed at the predetermined sub-area for controlling the processing means to transfer to, and display the same configuration of information at said different sub-area; and means for maintaining in storage in said computer storing means the transferred information.

6. Apparatus as claimed in claim 5 and in which the processing is means responsive to said touching at the said different sub-area for
terminating the display of said
information at said predetermined sub-area.

7. Apparatus as claimed in claim 5 and in which means is
provided operable upon said transfer to command the computer means to perform an additional transfer of information.

8. Apparatus as claimed in claim 5 and in which said computer data processing means includes means for displaying on said touch-screen display means predetermined boundaries of said plurality of sub-areas.

9. In a touch-screen video display system provided with data processing means for storing and displaying information upon a touch-screen display, a process that comprises, dividing the area of the touch-screen display into a plurality of sub-areas; displaying information provided by the processing means in a predetermined sub-area, the provided information having a specific configuration; touching at least a point of the said predetermined sub-area of the touch screen display and then subsequently touching at least a point of a different sub-area to which it is desired to transfer said information displayed at the predetermined sub-area; and controlling the processing means in response to the subsequent touching to transfer to, and display the same configuration of information displayed at the predetermined subarea at said different sub-area upon the said subsequent touching of said different sub-area.

10. A process as claimed in claim 9 and in which said dividing the area of the touch-screen display into a plurality of sub-areas comprises controlling the processing means so as to display on said touch-screen display predetermined boundaries of said sub-areas.

* * * * *